(12) United States Patent
D'Angelo et al.

(10) Patent No.: US 6,981,842 B2
(45) Date of Patent: Jan. 3, 2006

(54) BLEED VALVE SYSTEM

(75) Inventors: Gary D'Angelo, Bristol, CT (US); Tom Banach, Barkhamsted, CT (US); Robert Franconi, New Hartford, CT (US); James Gibb, Burlington, CT (US); Bob Goodman, West Hartford, CT (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/625,295

(22) Filed: Jul. 22, 2003

(65) Prior Publication Data

US 2005/0019156 A1    Jan. 27, 2005

(51) Int. Cl.
*F01B 25/00*    (2006.01)
(52) U.S. Cl. .................... 415/144; 415/28; 415/145
(58) Field of Classification Search ................ 415/144, 415/145, 28; 137/219; 251/63.5
See application file for complete search history.

(56) References Cited

U.S. PATENT DOCUMENTS

| | | | |
|---|---|---|---|
| 2,919,714 A * | 1/1960 | Mrazek | 137/220 |
| 2,950,732 A * | 8/1960 | Lambert | 137/219 |
| 3,125,115 A | 3/1964 | Gard | |
| 3,297,047 A * | 1/1967 | Sime | 137/220 |
| 3,521,661 A * | 7/1970 | Staiger et al. | 137/220 |
| 3,566,907 A * | 3/1971 | Sime et al. | 137/219 |
| 3,655,134 A * | 4/1972 | Greenland et al. | 60/230 |
| 4,175,584 A | 11/1979 | Rikuta | |
| 4,610,265 A * | 9/1986 | Nelson | 137/219 |
| 4,702,070 A | 10/1987 | Cureton et al. | |
| 5,477,673 A | 12/1995 | Blais et al. | |
| 6,122,905 A | 9/2000 | Liu | |
| 6,220,272 B1 | 4/2001 | Tavor | |
| 6,446,657 B1 | 9/2002 | Dziorny et al. | |

FOREIGN PATENT DOCUMENTS

| | | |
|---|---|---|
| DE | 23 43 069 A1 | 2/1975 |
| EP | 0 534 462 A1 | 3/1993 |
| EP | 0 936 357 A2 | 8/1999 |
| WO | PCT/US2004/023248 | 11/2004 |

\* cited by examiner

*Primary Examiner*—Edward K. Look
(74) *Attorney, Agent, or Firm*—Ingrassia Fisher & Lorenz (57) ABSTRACT

A bleed valve for use in a gas turbine engine is provided; the bleed valve may be used to relieve air pressure from a compressor stage of the engine. At normal pressure and when the engine is off, the bleed valve is in the open position. However once the engine starts, air pressure provided by the compressor closes the bleed valve. During engine operation, the bleed valve is opened to relieve air pressure by providing pressurized fluid, such as compressor air, to a valve chamber. The bleed valve is designed so that moveable parts of the valve, including contact seals and a sliding shaft, are protected by the valve structure from debris and contaminants carried in the engine's air stream.

34 Claims, 6 Drawing Sheets

BLEED VALVE SYSTEM

FIELD OF THE INVENTION

The present invention relates to pressure control in gas turbine engines. In particular the present invention relates to bleed valves for use at compressor stages within gas turbine engines.

BACKGROUND OF THE INVENTION

Gas turbine engines such as those used in industrial, marine, vehicle, and aerojet applications, may include multiple stages of compressors. In a typical arrangement air is first drawn over a first compressor stage that elevates the air pressure to a desired level. The air, while passing in a generally axial direction through the engine, then crosses successive compressor stages that further raise the air pressure.

It has been found that bleed valves can be used at various points on a gas turbine engine to assist in maintaining a desired level of air pressure within the engine. One area in a gas turbine engine where bleed valves are used is in the various compressor stages. A bleed valve or series of valves may be used to control undesired effects such as engine surge. Also it is desirable to provide pressure control during certain dynamic engine conditions such as start up, acceleration, and deceleration. And, in general bleed valves are beneficial for engine control.

Bleed valves are subject to a variety of stresses and pressures in the engine environment. Debris and fouling present in the engine in particular may adversely impact the moveable parts on a bleed valve. Moveable parts that include carbon sealing rings, springs, pistons, and piston support shafts are thus subject to wear during normal engine operation. In order to increase the durability and reliability of bleed valves, it would be desirable to provide a bleed valve design that protects moveable parts from adverse conditions such as debris and fouling.

Certain bleed valve designs also have a pressurized state as their normal mode of operation. In this kind of design, for example, the bleed valve is closed when the engine is in a normal running state. However, to achieve the closed position, the bleed valve in that design must be pressurized through some supply of a pressurizing fluid. Thus this kind of design may be called the "Pressurized Closed" design. When the bleed valve is to be opened, the pressurizing fluid is relieved, and the valve is allowed to open. The weakness in the "Pressurized Closed" design is the fact that the valve must endure the effects of pressurizing during the majority of the time the engine is in operation. Pressurizing subjects valve components to stress, and can thus hasten valve breakdown. Seals and rings, for example, tend to lose effectiveness after experiencing prolonged periods of pressurization. Hence, it would be desirable to provide a bleed valve design that permits a bleed valve to be in the closed position during normal engine conditions but without the need to pressurize the valve to reach the closed position.

The harsh operating environment in the contemporary gas turbine engine also places increased stress on engine components such as bleed valves. In an attempt to increase the efficiencies and performance of contemporary gas turbine engines, engineers have progressively pushed the engine environment to more extreme operating conditions. The higher pressures that are now frequently specified specifically place increased demands on bleed valves. Thus in current jet engine design there is also a need for a bleed valve design that is robust and reliable.

Certain bleed valve designs are known; nevertheless, there is need for an improved design. Hence there is a need for a new bleed valve design that addresses one or more of the above-noted drawbacks. Namely, a bleed valve design is needed that will protect moveable parts from debris and fouling, and/or that permits the bleed valve to be in the closed/nonpressurized position during normal engine conditions, and/or that provides a robust and reliable design. The present invention addresses one or more of these needs.

SUMMARY OF THE INVENTION

The present invention provides a bleed valve system. The bleed valve incorporates a housing and poppet that acts to protect moveable parts of the bleed valve from the debris and fouling encountered during engine operation. Parts of the bleed valve that are thus shielded include springs, shafts, wear surfaces, and sealing points. Additionally, the bleed valve system is designed so that it is in the closed/unpressurized state during periods of normal engine operation. The bleed valve design thus operates with minimal wear, stress, and fouling. Further the design provides a strong and reliable structure.

In one embodiment, and by way of example only, a bleed valve design is provided. The bleed valve is designed for use in a gas turbine engine and includes a housing with an inlet and an outlet, the housing is generally hollow with an inner and outer surface, the housing further defines an interior region and an exterior region; a shaft guide is fixed to the interior surface of said housing; a shaft is mounted in the shaft guide in a manner permitting the shaft to slide back and forth in the shaft guide; a poppet is attached to the shaft, the poppet having a seat to contact the a corresponding seat on the interior surface of the housing; a stationary piston is positioned in the interior region of the housing such that the stationary piston is in contact with the poppet whereby the stationary piston and the poppet define a fluid chamber; sealing rings may be located between the poppet and stationary piston; a biasing means such as a spring is positioned in the interior of this chamber; and a fluid inlet provides fluid communication between the chamber and the exterior region of the housing.

In another exemplary embodiment there is provided a bleed valve located at an intermediate compressor stage of a gas turbine engine for use to relieve compressor pressure in the engine wherein this bleed valve may move between an open and a closed position. The bleed valve includes a housing having an inlet exposed to compressor air and an outlet exposed to fan air; a shaft and shaft guide; a stationary piston; and a poppet that is moveably attached to the shaft. The poppet has a range of motion between an open and a closed position. When closed a face on the poppet engages a face on the housing so that air flow through the housing is restricted. Together the poppet and stationary piston define a chamber; optionally a carbon piston ring may be positioned between the poppet and stationary piston to promote a pressure seal in the chamber. A spring is positioned within the chamber that holds the poppet in an open position when the gas turbine engine is off but that permits the poppet to move to the closed position when the engine compressor provides pressurized air to flow over the poppet.

In yet another exemplary embodiment there is provided a high pressure bleed valve for use in a gas turbine engine. The high pressure bleed valve includes a housing with an inlet and an outlet, the housing is generally hollow with an inner and outer surface, the housing further defines an interior region and an exterior region; a shaft guide is fixed to the interior surface of said housing; a shaft is mounted in the shaft guide in a manner permitting the shaft to slide back and forth in the shaft guide; a poppet is attached to the shaft, the poppet having a seat to contact the a corresponding seat on the interior surface of the housing; a stationary piston is positioned in the interior region of the housing such that the stationary piston is in contact with the poppet whereby the stationary piston and the poppet define a fluid chamber; sealing rings may be located between the poppet and stationary piston; a biasing means such as a spring is positioned in the interior of this chamber; and a fluid inlet provides fluid communication between the chamber and the exterior region of the housing. The high pressure bleed valve also includes a secondary chamber that is vented by a vent providing fluid communication between the secondary chamber and the exterior of the housing. The secondary chamber is positioned to move within a cylinder. The secondary chamber and cylinder optionally are in contact by a sealing ring to provide a pressurized seal within the secondary chamber. Optionally the vent is open to the fan air surrounding the compressor stage where the bleed valve is located. Optionally the secondary chamber and vent are part of a cap structure.

In another exemplary embodiment, there is provided a high pressure bleed valve as described above. The bleed valve is located at a compressor stage of the engine, for example a high pressure compressor stage, such that the fluid pressure applied to the fluid inlet is taken from the compressor stage where the bleed valve is located.

Other independent features and advantages of the bleed valve system will become apparent from the following detailed description, taken in conjunction with the accompanying drawings which illustrate, by way of example, the principles of the invention.

DETAILED DESCRIPTION OF A PREFERRED EMBODIMENT

Reference will now be made in detail to exemplary embodiments of the invention, examples of which are illustrated in the accompanying drawings. Wherever possible, the same reference numbers will be used throughout the drawings to refer to the same or like parts.

Figure 1:
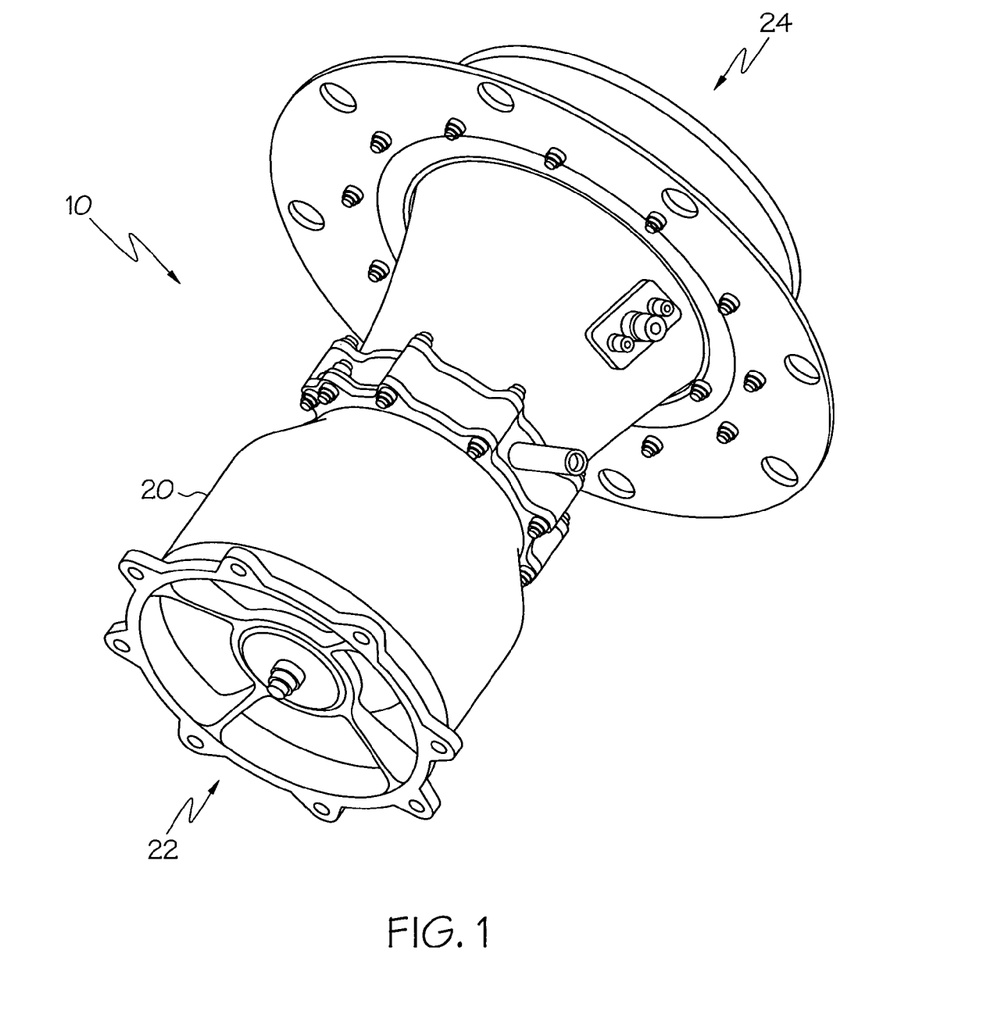
FIG. 1 is a perspective view of an intermediate pressure bleed valve according to one embodiment of the present invention.

Referring now to FIG. 1 there is shown a schematic view of an intermediate pressure bleed valve. Bleed valve 10 includes main housing 20 defining an interior region and an exterior area. As is known in the art, main housing 20 may have on its exterior means to affix the bleed valve to the engine body. Flanged bolt holes with through bolts is one method by which the bleed valve may be attached to the engine. Main housing 20 may be a unitary or multi-component piece. For ease of manufacturing a multi component housing is preferred. Generally, the interior region of main housing 20 allows air to pass from opening 22 of main housing 20 through the interior region and passing out of outlet 24, when the valve is in the open position. When closed, the valve restricts the passage of air through the main housing.

Figure 2:
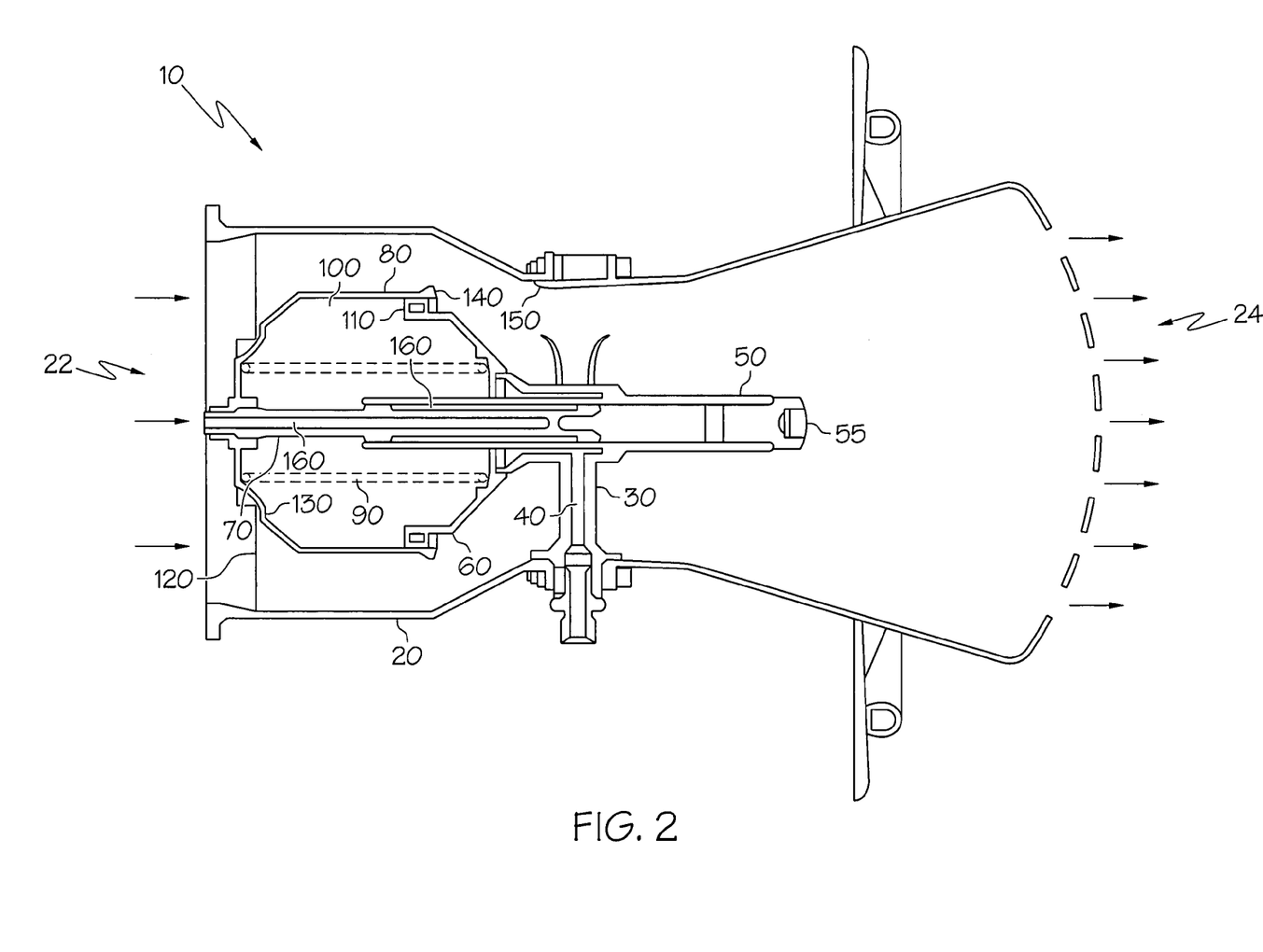
FIG. 2 is a cut away side view of the intermediate pressure bleed valve in the open position.

Referring now to FIG. 2 there is shown a cut away side view of a preferred embodiment of an intermediate pressure bleed valve. Disposed within the interior region of main housing 20 are other elements of the bleed valve, including stationary piston 60, poppet 80, shaft 70, shaft guide 50, support element 30, spring 90 and fluid inlet 40.

Still referring to FIG. 2 in a preferred embodiment, support element 30 is attached to main housing 20 and provides the structure that attaches to stationary piston 60 and/or shaft guide 50. Support element 30 may be a single or multiple piece, meaning there may be more than one support element 30. FIG. 2 illustrates one support element; preferably, however, three support elements 30 are used. In an embodiment with more than one support element 30 each support element is preferably radially spaced along the interior surface of main housing. Although equal spacing of the support elements is not necessary, it is preferred. Thus, in the embodiment with three support elements, each is equally radially spaced from the others. Support elements 30 do allow passage of air around them when air passes through the interior of main housing 20.

Support element 30 illustrated in FIG. 2 further includes fluid inlet 40. Fluid inlet 40 is a passage that provides fluid communication from the exterior of main housing 20 with a point in its interior region. While it is preferred (to reduce mass and obstructions) that fluid inlet 40 passes through support element 30, these may be separate structures.

Still referring to FIG. 2 and proceeding to the structure held by support element 30, support element 30 is attached to shaft guide 50 and/or stationary piston 60. Shaft guide 50 and stationary piston 60 are, preferably, separate structures. However alternatively, shaft guide 50 and stationary piston 60 are a unitary structure. Thus, it is stated that support element 30 is attached to shaft guide 50 and/or stationary piston 60 to include the alternative where shaft guide 50 and stationary piston 60 are a unitary structure. Further, it is possible in one embodiment for support element to attach to stationary piston 60 rather than shaft guide 50.

Shaft guide 50 is generally a hollow cylinder in shape. Shaft 70 is disposed within shaft guide 50, but shaft 70 is allowed to slide within shaft guide 50. Channels 160 may be included within shaft guide 50 and/or stationary piston 60 to provide fluid communication between fluid inlet 40 and fluid chamber 100.

At one end, shaft 70 is attached to poppet 80. Spring 90 is disposed around shaft 70 and shaft guide 50 in fluid chamber 100. Fluid chamber 100 is the region defined by poppet 80 and stationary piston 60. Shaft 70 may be attached to poppet 80 by conventional means such as a press fitting or a retaining nut.

In a preferred embodiment, shaft 70 includes flats. Flats contact the interior surface of shaft guide 50 thereby providing a uniform and smooth movement for shaft 70 throughout the stroke of shaft 70. The number of flats provided may be one or more, preferably two or more flats are used.

Stationary piston 60 includes sealing ring 110. In order to operate well at the pressures and temperatures encountered in the engine environment, sealing ring 110 is preferably a carbon piston ring. Other kinds of rings or sealing materials may be used as sealing ring 110. While it is preferred that sealing ring 110 is attached to stationary piston 60, in an alternative embodiment, sealing ring 110 is attached to poppet 80.

Preferably stationary piston 60 and poppet 80 include surfaces on which a biasing means or spring may rest.

Stop 120 may be attached to main housing 20. Preferably, poppet 80 touches stop 120 at resting point 130. Thus resting point 130 limits the travel permitted to poppet 80. Bleed valve 10 may include one or more stops 120. However, stop 120 should generally allow air passage from inlet 22 through the interior region of main housing 20.

Figure 3:
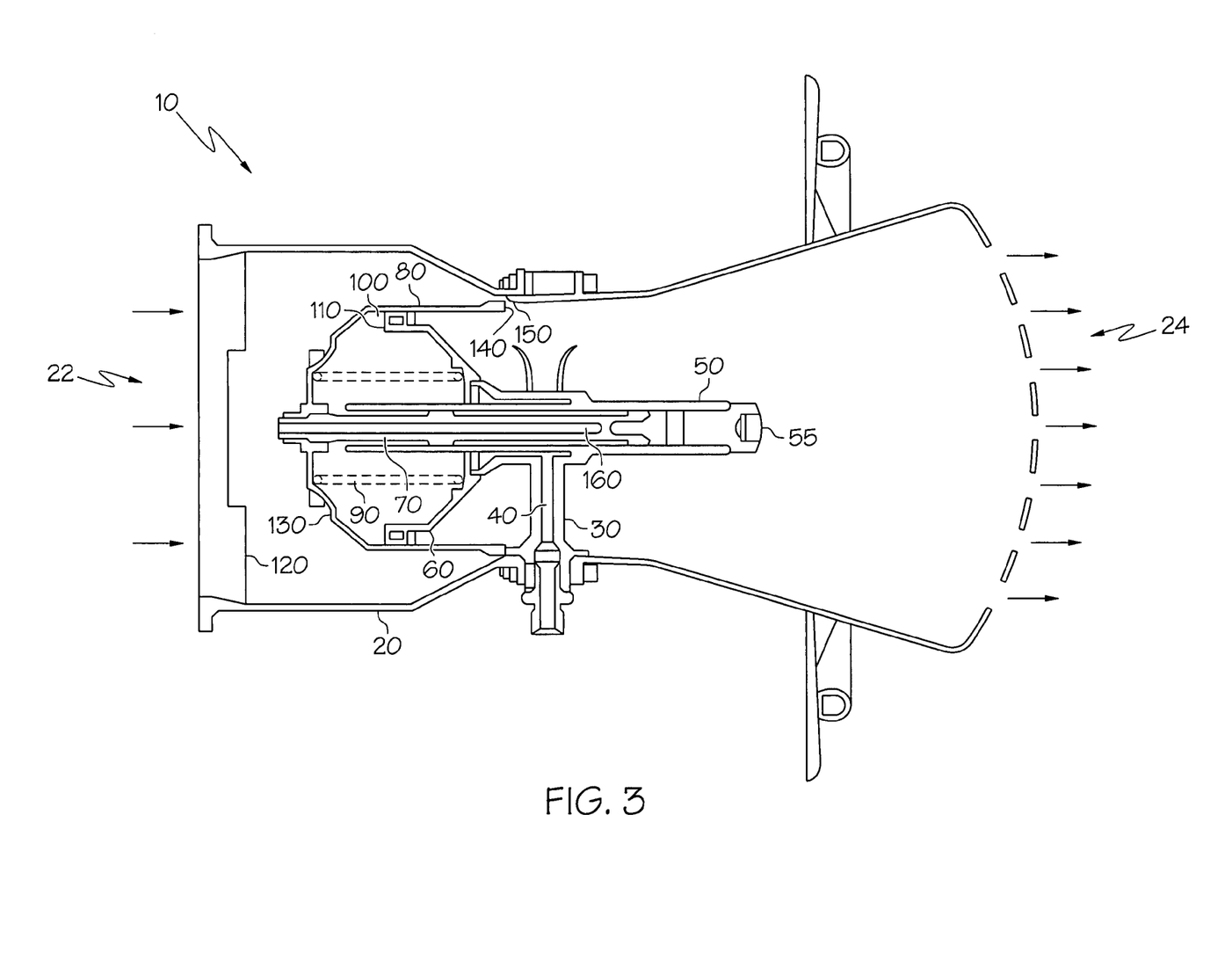
FIG. 3 is a cut away side view of the intermediate pressure bleed valve in the closed position.

Poppet 80 includes poppet seat 140. Poppet seat 140 rests against a corresponding housing seat 150 that is attached to main housing 20. When bleed valve 10 is in the closed position, poppet seat 140 mates against housing seat 150 thus restricting the passage of air through the valve body.

Fluid chamber 100 defined by poppet 80 and stationary piston 60 receives pressure from a fluid such as air that is admitted by fluid inlet 40 and channels 160. Poppet 80 is attached to shaft 70 in a manner that prevents or minimizes pressure loss from fluid chamber 100. Further shaft guide 50 is capped at one end so as to prevent or minimize pressure loss from fluid chamber 100 through shaft guide 50 by cap 55. Likewise stationary piston 60 is attached to shaft guide 50 so as to prevent or minimize pressure loss from fluid chamber 100. Finally, sealing ring 110 provides a firm contact between poppet 80 and stationary piston 60 while still allowing movement therebetween. The degree of contact provided by sealing ring 110 is such that pressure admitted to fluid chamber 100 will be sufficiently maintained within fluid chamber 100 by sealing ring 110 so as to allow fluid chamber pressure to provide movement to poppet 80.

Having described the intermediate pressure bleed valve system from a structural standpoint, a method of using such an assembly in operation will now be described.

Under normal atmospheric conditions, such as when the engine is not running, spring 90 holds bleed valve 10 in the open position. That is spring 90 or biasing means pushes against stationary piston 60 and poppet 80 holding poppet 80 against resting point 130 of stop 120. Once the engine starts, compressor stages begin to pressurize air flowing through the engine. Inlet 22 of bleed valve 10 begins to experience pressurized air flow. This pressurized air impacts against poppet 80. The pressure on poppet 80 overcomes the force provided by spring 90 and drives poppet 80 to the closed position. When bleed valve 10 moves through its stroke from the open to the closed position, shaft 70 slides within shaft guide 50. In the closed position poppet seat 140 rests against housing seat 150. The closure of poppet seat 140 with housing seat 150 restricts air from flowing through the bleed valve body.

When it is desired that bleed valve 10 should open, a signal is sent to provide pressure to fluid inlet 40. Preferably, pressure is supplied to fluid inlet 40 from a solenoid valve subject to computer control. Moreover the fluid that is used to provide fluid pressure is preferably pressurized air taken from a compressor stage at a higher pressure than the compressor stage where the valve is located. Thus, for example, air taken from a high pressure compressor stage may be directed through fluid lines to fluid inlet 40 of bleed valve 10 located at an intermediate compressor stage. Once high pressure air is admitted to fluid inlet 40, the high pressure air within fluid chamber 100 provides force adequate to overcome the intermediate air pressure that is tending to close bleed valve 10. So by overcoming the intermediate pressure, high pressure air pushes bleed valve to the open position.

The act of moving from the closed to the open position can be described in further detail. As pressurized fluid is admitted to fluid inlet 40 it runs through channels 160 to fluid chamber 100. Within fluid chamber 100 the pressurized air pushes against the interior surfaces of poppet 80 and stationary piston 60. In reaction to this force, poppet 80 moves laterally. As poppet 80 moves, shaft 70 also moves within shaft guide 50. If the pressure is sufficient and the pressure is maintained for a sufficient period of time, poppet 80 will move along the full length of its stroke until poppet 80 hits resting point 130 of stop 120. In certain operations, poppet 80 may only be pressurized for a momentary period of time so that, while beginning to move along its stroke from the closed to the open position, poppet 80 never reaches the completely open position. The movement of poppet 80 to the open position also separates poppet seat 140 from housing seat 150. This opens a passageway through the interior of main housing 20 so that air can freely pass from inlet 22, through main housing 20, and exit at outlet 24.

When, during engine operation, it is desired to close bleed valve 10 from the open position, pressure at fluid inlet 40 is removed. Again, this is preferably achieved by solenoid valve under computer control. Thereupon the pressure within fluid chamber 100 is abated. Preferably the air pressure may be released from fluid chamber 100 by passing through fluid inlet 40 (in a reverse direction from when entering the bleed valve) to a release vent that is not shown. The air pressure force acting on poppet 80 again moves the poppet to the closed position. And at the closed position poppet seat 140 makes contact with housing seat 150 thus restricting air flow through the interior of main housing 20.

A further embodiment of the present invention is particularly directed to use at high pressure compressor stages. High pressure bleed valves present a unique challenge not encountered with an intermediate pressure bleed valve. At the intermediate compressor stage, pressure to activate the bleed valve can be obtained from a compressor stage with a higher pressure than that at the intermediate compressor stage. Thus, as described above, the high pressure air will offset the intermediate pressure air, allowing the bleed valve to open. However, at the high pressure stage, there is no source of still higher pressure air with which to overcome the pressure of that stage. The high pressure bleed valve described herein overcomes this problem by providing a secondary chamber.

Figure 4:
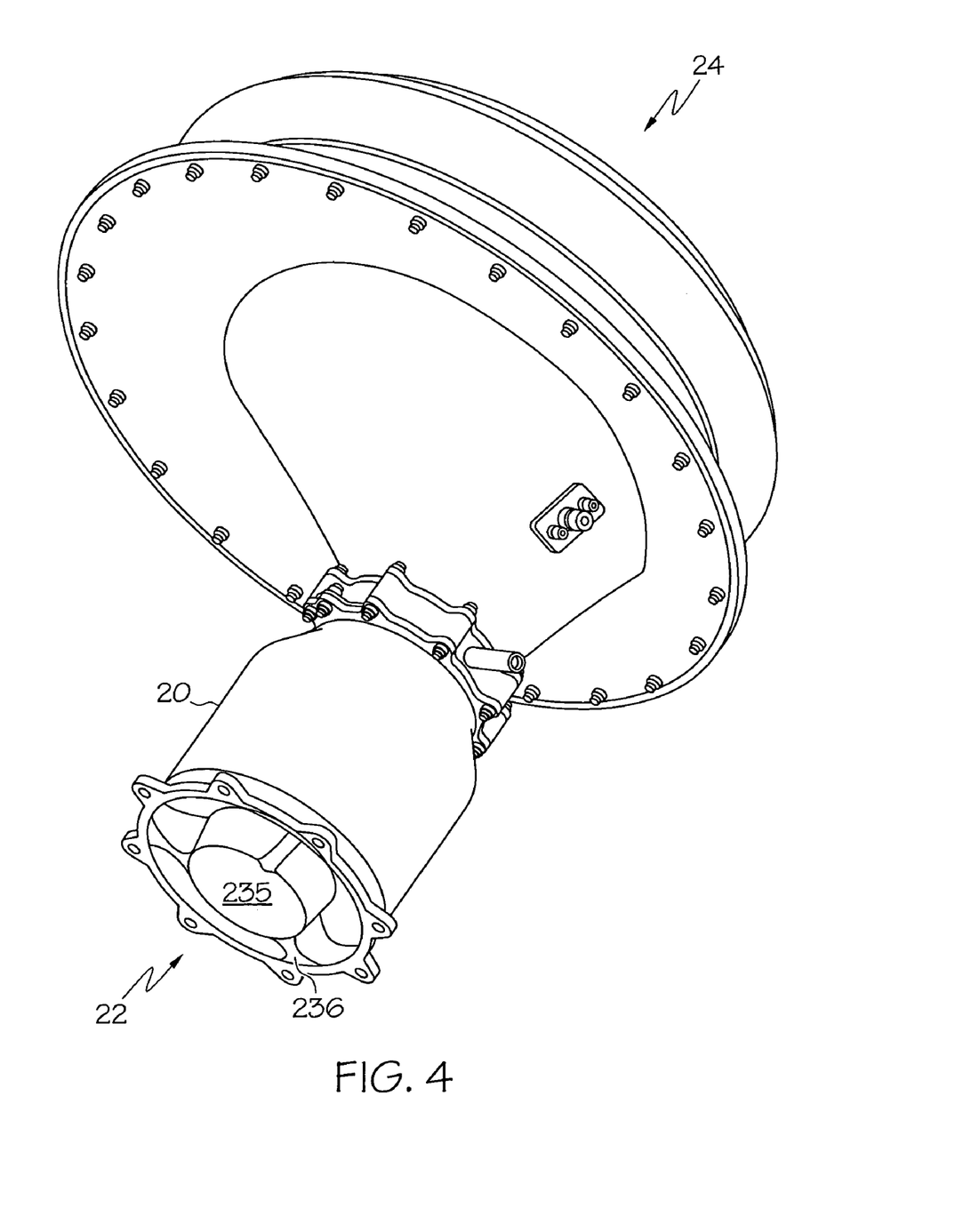
FIG. 4 is a perspective view of a high pressure bleed valve according to one embodiment of the present invention.

Referring now to FIG. 4 there is shown a perspective view of a high pressure type bleed valve. The design of the high pressure bleed valve embodiment is generally similar to the intermediate bleed valve design, but does include certain differences. The high pressure bleed valve includes a main housing 20 defining an interior region and an exterior area. Main housing 20 allows air to pass from opening 22 through its interior to an outlet 24. A high pressure bleed valves also includes elements in the intermediate pressure bleed valve such as poppet 80, stationary piston 60, shaft 70, shaft guide 50, support element 30 spring 90 fluid inlet 40 sealing ring 110, poppet seat 140, housing seat 150, channels 160, and cap 55.

Figure 5:
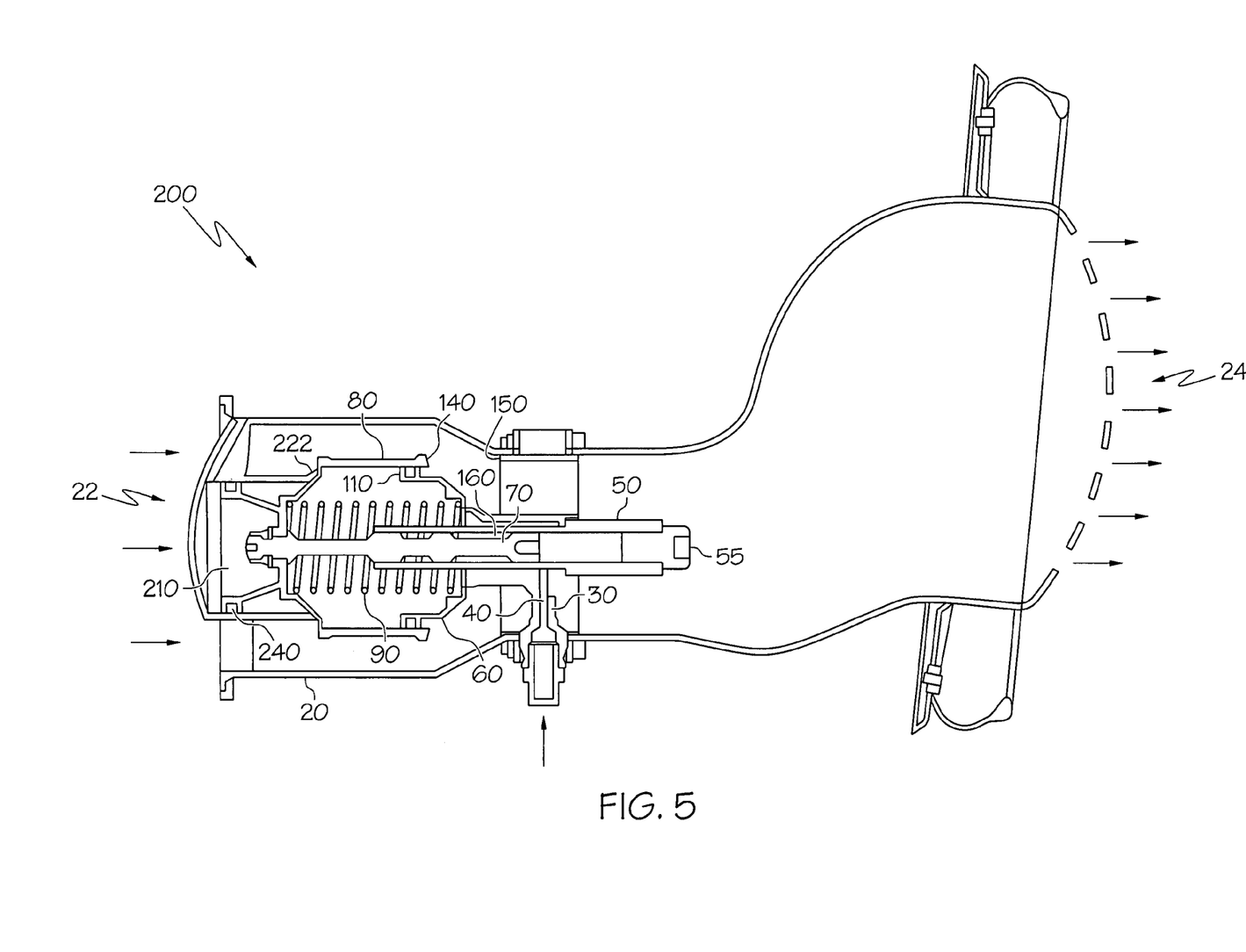
FIG. 5 is a cut away side view of the high pressure bleed valve in the open position.

Referring now to FIGS. 4 and 5, cut away views, high pressure bleed valve 200 also includes secondary chamber 210, cylinder 220, vent 230, and secondary sealing ring 240.

Figure 6:
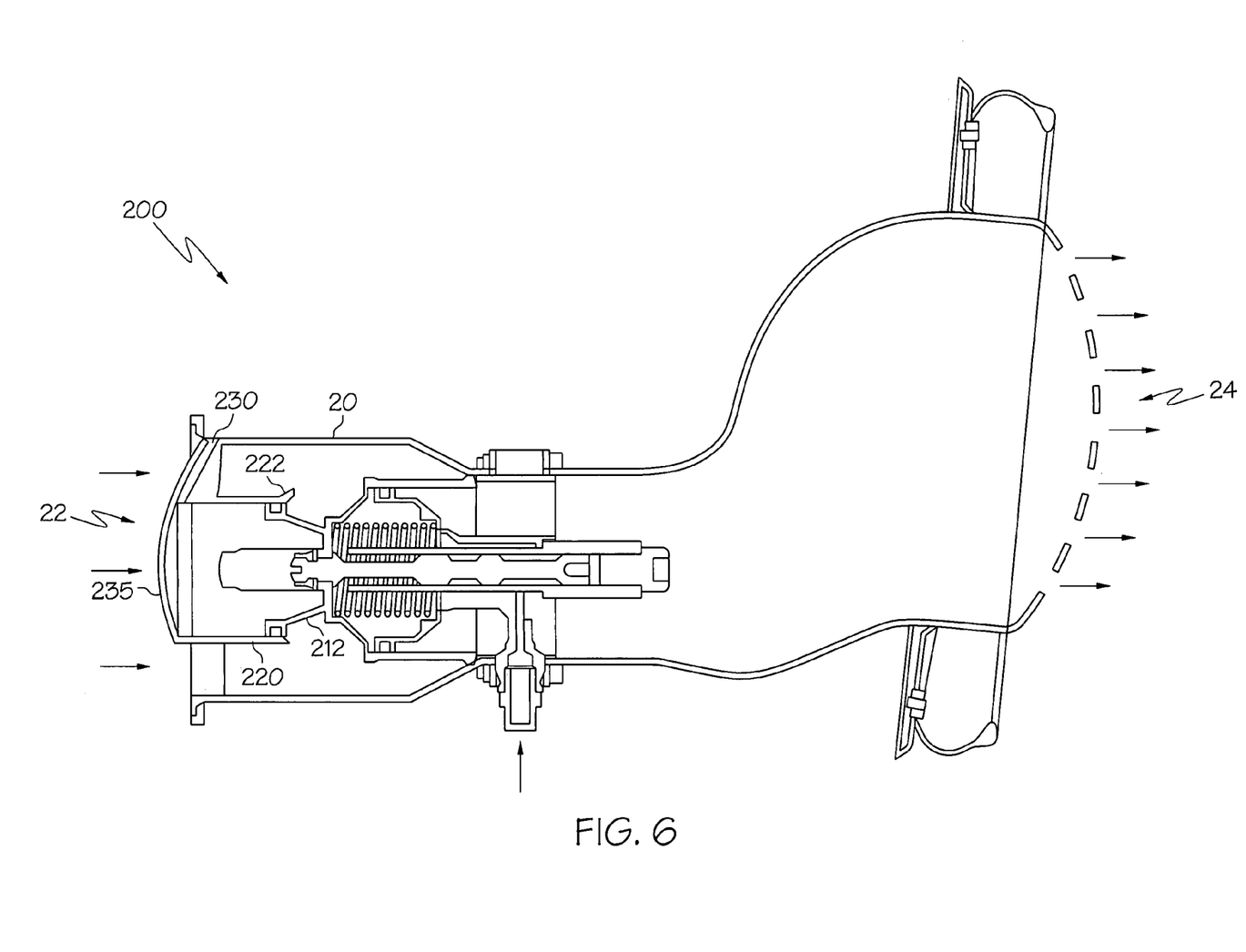
FIG. 6 is a cut away side view of the high pressure bleed valve in the closed position.

FIG. 5 shows the high pressure bleed valve in the open position, and FIG. 6 shows the high pressure bleed valve in the closed position.

Still referring to FIGS. 5 and 6, secondary chamber 210 extends in a generally lateral position from fluid chamber 100 toward the main housing inlet 22. Secondary chamber 210 is generally defined by wall 212 extending from the body of poppet 80 together with cap structure 235. In a preferred embodiment, wall 212 that defines secondary chamber 210 is formed as a unitary piece with poppet 80 although other configurations, such as wall 212 being a separate piece, are possible.

Fluid in secondary chamber 210 is vented to a position outside main housing 20 through vent 230. Further, secondary sealing ring 240 provides a contact between secondary chamber 210 and cylinder 220. In a preferred embodiment secondary sealing ring 240 is in contact with cylinder 220 both when the valve is in its fully open and fully closed position. This contact, together with the opening through vent 230, maintains the pressure within secondary chamber 210 generally at the air pressure that is present where vent 230 exits main housing 20. Preferably, this air pressure is lower than the air pressure at main housing inlet. Preferably, this is vented to the fan area in an aerojet engine.

In a preferred embodiment the high pressure bleed valve includes a plurality of vents 230 such as three or four in number. In one embodiment, vents 230 are passageways defined in a cap structure 235. One embodiment of such a cap structure 235 is shown in FIG. 4. Cap structure 235 generally provides a structure to which both vents 230 and cylinder 220 are attached. Preferably, cap structure 235 is a unitary body with vents 230 and cylinder 220. Cap structure 235 further defines arms 236 wherein are located vents 230. Spaces between arms 236 define passages to allow air to travel from inlet 22 into the body of the bleed valve. Preferably arms 236 further provide a surface whereby to attach cap structure 235 to the body of main housing 20. It is also to be noted that cap structure 235, together with cylinder 220, act to isolate the pressure in secondary chamber 210 from the air pressure at inlet 22, when secondary sealing ring 240 is in contact with cylinder 220.

As with the intermediate pressure bleed valve, the high pressure bleed valve is free to move along a stroke between an open and a closed position. At the fully open position, shown in FIG. 5, it is preferred that cylinder landing 222 contacts a surface of poppet 80. Cylinder landing 222 is a receiving surface formed on cylinder 220 in order to receive contact with the surface of poppet 80. It is this contact that establishes the fully open position for the bleed valve. This contact defines the outer movement of poppet to the open position. Optionally the surface of poppet 80 can include a receiving surface to match with cylinder landing 222. As with the intermediate pressure embodiment, when bleed valve is in the fully closed position, shown in FIG. 6, poppet seat 140 contacts housing seat 150, thereby restricting fluid passage through the body of main housing 20.

The high pressure bleed valve design operates with what is sometimes referred to as a "half area" actuator. (In the present invention the term "half" has no exact mathematical or relational significance; it is descriptive only of the type of design.) This method of operation relates to the fact that the air pressure at main housing inlet 22 is approximately the same as the air pressure at fluid inlet 40. However, air pressure to fluid chamber 100 provides enough force to open the valve because secondary chamber 210, is in fluid communication with atmosphere outside the bleed valve. Preferably, the boundary walls of secondary chamber 210 are conical, polygonal, angled, or curved in shape. This shape defines a series of cross sections. The area of a cross section taken from secondary chamber 210 increases as the cross section moves progresses from a point beginning adjacent to poppet 80 to a point at sealing ring 240. This is illustrated as cross sections beginning with point A and moving to point B in FIG. 6.

In the previous paragraph the air pressures at main housing 20 inlet and at fluid inlet 40 are stated to be "approximately" the same for the following reason. In a preferred embodiment, the air that is provided to fluid inlet 40 is air that is drawn from the same compressor stage where the bleed valve is positioned. Thus, these fluids should be at approximately the same pressures although in a precisely quantified measure, the pressures may fluctuate and be different. This is because in a dynamic engine environment, there may be relatively small pressure differentials between specific locations in a single compressor when measured at specific times. Thus fluid inlet pressure may actually be slightly different from the pressure acting at the bleed valve inlet, and yet these two pressures can be said to be approximately the same.

In operation a high pressure bleed valve operates similarly to the intermediate pressure bleed valve. With the engine off and at normal atmospheric conditions, a high pressure bleed valve is in the open position. Spring 90 pushes against stationary piston 60 and poppet 80 so as to hold poppet 80 in contact with cylinder landing 222. When the engine starts and the engine compressor begins to pressurize air flowing through the engine, air pressure at inlet 22 acts against poppet 80 so as to push poppet 80 through the length of its stroke to the closed position, where poppet seat 140 rests against housing seat 150. Air pressure admitted to fluid inlet 40, preferably air taken from the same pressure level as that at inlet 22 of a high pressure bleed valve, passes through channels 160 into fluid chamber 100 thereby pushing poppet 80 from the closed position, through its stroke, to the open position. During movement from the closed to the open position, air in secondary chamber 210 exits through vent 250. If the pressure remains applied, the movement of poppet 80 continues until poppet surface contacts cylinder landing 222. Preferably pressure is controlled through a solenoid valve.

When pressure admitted to chamber 100 is abated, the bleed valve returns to the closed position. Compressor air passing through inlet 22 impinging on poppet 80 forces it to the closed position. The movement to the closed position also moves secondary chamber 210 within cylinder 220 such that the volume of secondary chamber 210 increases. No vacuum resistance is encountered to this movement, however, because secondary chamber 210 is vented to a point outside the valve body through vent 230.

A first advantage of the disclosed bleed valve system is the operation of the bleed valve in a closed position without the need for pressure in the valve. Normal engine operation under normally expected conditions constitutes the majority of engine running time. It is during these normal conditions that the bleed valve should be in the closed position. The function of a bleed valve, to siphon off excess pressure, is only needed during moments of engine operation. Thus, the present design provides an advantage of reaching the closed position without the need for pressure to be applied to the valve. This minimizes stress and wear on a valve arising from pressurized operation. In particular the sealing rings do not encounter the stress of pressurized operation while the valve is closed under this design.

A further advantage of the bleed valve design is that it avoids debris and contamination reaching moving parts of the valve. Two components of the bleed valve in particular benefit from protection, and those are sealing ring 110 and shaft 70. Note that chamber 100 formed by poppet 80 and stationary piston 60 in the design of both the intermediate and the high pressure bleed valve acts to isolate shaft 70 from the air passage that takes place when compressor air passes through bleed valve main housing 10. Further the shaft guide cap and shaft guide 50 protect shaft 70 from engine air. This design therefore protects an important moving part of the bleed valve.

Still a further advantage of this method is the protection provided to sealing ring 110 from air borne contaminants. In the intermediate pressure bleed valve, sealing ring 110 is protected against exposure to engine air when bleed valve 10 is closed. When closed poppet seat 140 and housing seat 150 engage to prevent engine air from passing through main housing 20. Thus sealing ring is not exposed to pressurized air when the valve is in the closed position. In the open position, air passes around the body of poppet 80 and on across stationary piston 60. The position of sealing valve, with poppet 80 providing an outer protection and stationary piston 60 providing an inner protection, acts to protect sealing ring 110 from extensive air damage when open. Further, for the majority of time during engine operation, bleed valve 10 is expected to be closed.

Still an additional advantage is the low pressure loss associated with the valve design. The valve housing presents a streamlined path for air passing through the valve body. The streamlined path helps minimize pressure loss in bleed air passing through the valve. This is true of both the intermediate pressure design and the high pressure design.

The contact of poppet seat 140 with housing seat 150 has been described as restricting air flow through the interior of main housing 20. Those skilled in the art will understand that the air flow is significantly restricted so that the desired pressure control or engine control is achieved. Thus a small or minute amount of air may pass through bleed valve 10 even when in the closed position. For example, small surface irregularities on poppet seat 140 and housing seat 150 may permit a small amount of air flow. Nevertheless this small fluid flow is not so great as to defeat the bleed valve function of substantially restricting air flow in the closed position.

The terms high pressure and intermediate pressure have been used in discussing the bleed valve embodiments disclosed herein. While the terms intermediate pressure and high pressure do have relative significance in that, in a preferred embodiment, the high pressure valve operates at a compressor stage with higher pressure than that of the intermediate pressure bleed valve (when both valves are used together in the same engine), the terms do not have a specific or quantified meaning. Thus the valves may operate in a multitude of gas turbine engines over a range of specific pressures provided they are used in the relative position described herein. Additionally, an intermediate pressure bleed valve may be used at any position in an engine compressor, provided there is a higher pressure compressor stage from which to feed air into fluid inlet 40 of an intermediate pressure bleed valve. Further, a high pressure bleed valve could be used at any position on an engine compressor where the pressure into fluid intlet 40 of a high pressure bleed valve is approximately the same pressure as that entering inlet 22 of main housing 20. In a preferred embodiment, both the intermediate pressure design and the high pressure design are used together in the same engine with the intermediate pressure bleed valve placed at a compressor stage of generally intermediate pressure and with the high pressure bleed valve placed at a compressor stage with pressure higher than that of the compressor where the intermediate pressure bleed valve is located.

The materials that are used to construct the bleed valve designs described herein are those materials suitable for use in gas turbine engines, and especially including those materials suitable for aerojet turbine engines. Preferred materials include Inconel alloys.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A bleed valve for use in a gas turbine engine comprising:
   a housing with an inlet and an outlet said housing being hollow with an inner and outer surface; said housing further defining an interior region and an exterior region;
   a hollow shaft guide fixed to the interior surface of said housing, wherein said hollow shaft guide is capable of receiving fluid pressure;
   a shaft slidably mounted in said hollow shaft guide;
   a poppet attached to said shaft, said poppet having a seat to contact the interior surface of said housing;
   a stationary piston positioned in the interior region of said housing, said stationary piston in contact with said poppet whereby said stationary piston and said poppet define a fluid chamber and wherein said fluid chamber is in fluid communication with said hollow shaft guide;
   sealing rings located between said poppet and said stationary piston;
   a biasing means positioned in the interior of said chamber; and
   a fluid inlet providing fluid communication between said chamber and the exterior region of said housing through said hollow shaft guide.

2. The bleed valve of claim 1 wherein said sealing rings comprise carbon piston rings.

3. The bleed valve of claim 1 wherein said sealing ring provides a degree of contact sufficient to maintain a pressurized seal within said fluid chamber whereby fluid pressure admitted to chamber can move said poppet.

4. The bleed valve of claim 1 wherein said biasing means comprises a spring.

5. The bleed valve of claim 4 wherein said spring moves the bleed valve into an open position at atmospheric pressures.

6. The bleed valve of claim 1 wherein air pressure from a compressor stage with a pressure higher than the pressure of the compressor stage where the bleed valve is located provides the air for fluid inlet.

7. The bleed valve of claim 1 further comprising a stop whereby said poppet rests against said stop when said valve is in a fully open position.

8. The bleed valve of claim 1 wherein said stationary piston is affixed to said shaft guide.

9. The bleed valve of claim 1 further comprising a housing seat corresponding to said seat on said poppet whereby said housing seat and said poppet seat restrict airflow through said housing when said housing seat contacts said poppet seat.

10. The bleed valve of claim 1 further comprising at least one support element affixed to the interior surface of said housing and providing support for said shaft guide.

11. A bleed valve located at an intermediate compressor stage of a gas turbine engine for use to relieve compressor pressure in the engine wherein said bleed valve may move between an open and a closed position comprising:
   a housing defining an interior and an exterior and having an inlet exposed to compressor air and an outlet exposed to fan air;
   a shaft positioned within the interior of said housing;
   a stationary piston;
   a poppet moveably attached to said shaft, said poppet having a range of motion between an open and a closed position; said poppet having a face exposed to compressor air from said housing inlet;
   a chamber defined by said poppet and said stationary piston; and
   a spring that holds said poppet in an open position when the gas turbine engine is off but that permits said poppet to move to the closed position when said compressor provides pressurized air.

12. The bleed valve of claim 11 further comprising a poppet seat located on said poppet and a corresponding housing seat on said housing wherein said poppet scat contacts said housing seat when the valve is in the closed position, thereby restricting air flow through said housing.

13. The bleed valve of claim 11 wherein compressor pressure at said housing inlet is less than the pressure in said chamber, when fluid pressure is provided to said chamber, whereby the pressure in said chamber moves said poppet from the closed to the open position.

14. The bleed valve of claim 11 wherein the fluid provided to said chamber through said fluid inlet is air taken from a compressor stage wit pressure that is higher than the pressure at the compressor stage where said bleed valve is located.

15. The bleed valve of claim 11 wherein said shaft further comprises at least one flat for providing a slideable contact between said shaft and said shaft guide.

16. The bleed valve of claim 11 further comprising a stop affixed to said housing wherein said poppet contacts said stop when in the open position.

17. The bleed valve of claim 11 further comprising a shaft guide positioned within the interior of said housing wherein said shaft moves within said shaft guide.

18. The bleed valve of claim 17 further comprising a cap affixed to said shaft guide to provide a pressure seal within said shaft guide.

19. The bleed valve of claim 11 further comprising a wall defining a secondary chamber attached to said poppet; a vent providing fluid communication between said secondary chamber and the exterior of said housing, and a cylinder within which said secondary chamber moves.

20. The bleed valve of claim 19 further comprising a secondary sealing ring to provide a pressurized seal between said secondary chamber and cylinder.

21. The bleed valve of claim 19 further comprising at least one arm affixed to said housing wherein said vent is positioned within said arm.

22. The bleed valve of claim 19 further comprising a cap structure affixed to said housing said cap structure comprising said arm and cylinder.

23. A high pressure bleed valve for use in a gas turbine engine comprising:
   a housing with an inlet and an outlet said housing being hollow with an inner and outer surface; said housing further defining an interior region and an exterior region;
   a shaft guide fixed to the interior surface of said housing;
   a shaft slidably mounted in said shaft guide;
   a poppet attached to said shaft, said poppet having a seat to contact the interior surface of said housing;
   a stationary piston positioned in the interior region of said housing, said stationary piston in contact with said poppet whereby said stationary piston and said poppet define a fluid chamber;
   sealing rings located between said poppet and said stationary piston;
   a biasing means positioned in the interior of said chamber; and
   a fluid inlet providing fluid communication between said chamber and the exterior region of said housing;
   a wall defining a secondary chamber positioned adjacent said poppet;
   a vent providing fluid communication between said secondary chamber and the exterior of said housing, and
   a cylinder within which said secondary chamber moves.

24. The bleed valve of claim 23 further comprising a secondary sealing ring to provide a pressurized seal between said secondary chamber and cylinder.

25. The bleed valve of claim 23 further comprising at least one arm affixed to said housing wherein said vent is positioned within said arm.

26. The bleed valve of claim 23 further comprising a cap structure affixed to said housing said cap structure comprising said arm and cylinder.

27. The bleed valve of claim 23 wherein the bleed valve is located at a compressor stage of the engine and the fluid pressure applied to said fluid inlet is taken from the compressor stage where the bleed valve is located.

28. The bleed valve of claim 23 wherein said vent is open to the fan air surrounding the compressor stage where the bleed valve is located.

29. The bleed valve of claim 23 wherein said cylinder further comprises a cylinder landing wherein said poppet contacts said cylinder landing.

30. A method for controlling pressure within a gas turbine compressor stage comprising the steps of:
   moving a poppet into an open position such that air is free to flow through a housing body;
   passing compressor air across said poppet thereby moving said poppet into a closed position;
   admitting air pressure into a fluid chamber thereby moving said poppet into an open position;
   passing compressor air through the body of said housing while said poppet is in the open position for a desired time; and
   removing air pressure from a fluid chamber thereby allowing said poppet to return to a closed position.

31. The method of claim 30 wherein the step of moving a poppet into an open position is achieved by a spring located within said chamber.

32. The method of claim 30 wherein the air admitted to said chamber is at a pressure higher than the pressure of the compressor air admitted into the housing.

33. The method of claim 30 wherein the steps are performed in the order presented.

34. The method of claim 30 further comprising the step of venting air from a secondary chamber to a point outside the housing body.

* * * * *

UNITED STATES PATENT AND TRADEMARK OFFICE
CERTIFICATE OF CORRECTION

PATENT NO. : 6,981,842 B2
APPLICATION NO. : 10/625295
DATED : January 3, 2006
INVENTOR(S) : Gary D'Angelo et al.

Page 1 of 1

It is certified that error appears in the above-identified patent and that said Letters Patent is hereby corrected as shown below:

In Column 11, line 30, delete "scat" and add --seat--

In Column 11, line 40, delete "wit" and add --with--

Signed and Sealed this

Sixteenth Day of October, 2007

JON W. DUDAS
*Director of the United States Patent and Trademark Office*